Figure 1:
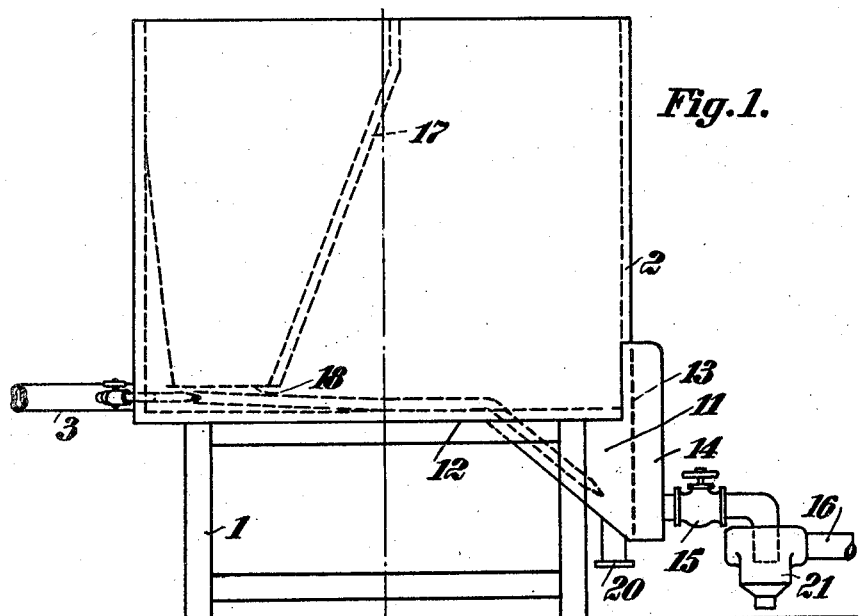

Jan. 20, 1925.

A. HORTEN 1,523,645

MIXING TANK FOR FIELD WATERING PLANTS

Filed July 15, 1924

Inventor
A. Horten
By Marks & Clerk
Attys.

Patented Jan. 20, 1925.

1,523,645

UNITED STATES PATENT OFFICE.

ALPHONS HORTEN, OF BERLIN-WILMERSDORF, GERMANY.

MIXING TANK FOR FIELD-WATERING PLANTS.

Application filed July 15, 1924. Serial No. 726,224.

*To all whom it may concern:*

Be it known that I, ALPHONS HORTEN, residing at 16 Brandenburgischestrasse, Berlin - Wilmersdorf, Germany, have invented certain new and useful Improvements in Mixing Tanks for Field-Watering Plants, of which the following is a specification.

This invention relates in general to field watering plants and more particularly to mixing tanks therefor.

It has already been proposed to supply water for field watering purposes from rivers, ponds and other sources together with the mud and slime from these sources through subterranean pipe systems or through spraying or distributing devices arranged above the ground.

This invention relates to arrangements by which solid matter is mixed with the water used for field watering purposes, the arrangement being such that any desired amount of solid matter may be added to the water in cases in which the water is not taken from sources that contain the mud or slime in the first instance. The device according to the invention consists of a tank of cylindrical or any other desired form in which there is a partition extending downward to a level near the bottom of the tank and forming a compartment for the reception of the solid matter, and a discharge pocket at the bottom of the tank located at a considerable distance from said compartment. The arrangement also includes influx pipes for directing strong liquid jets at the bottom of said compartment and in said pocket. Other features of the invention will appear hereinafter in the specification and claims.

The invention is shown in the drawing in which—

Figure 2:
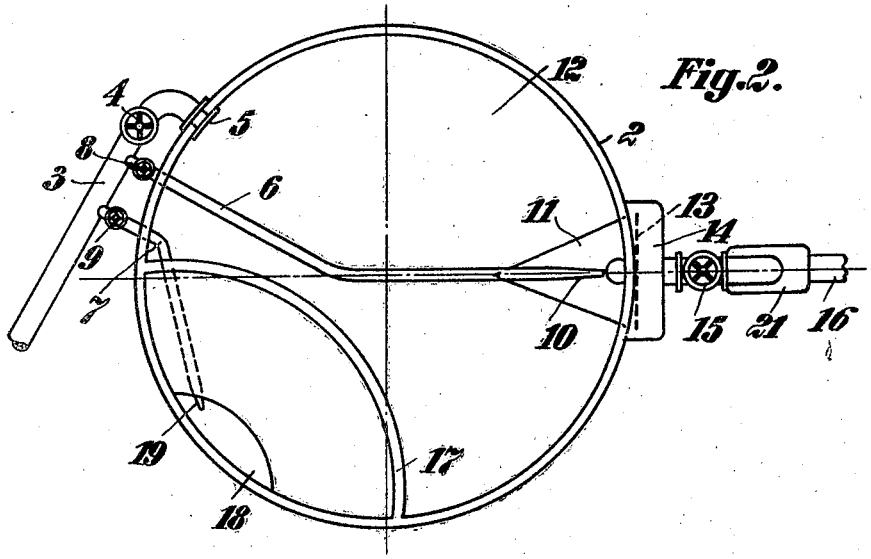

Fig. 1 is a more or less diagrammatic elevation of a mixing tank connected to the pipe system and Fig. 2 is a plan view of Fig. 1.

The mixing device comprises a tank 2 mounted at a certain height on a base or pump 1. Clear water or waste water is supplied to the tank 2 through a comparatively large feed-water pipe 3, the influx of water through the mouth 5 of the pipe being controlled by a valve 4. Two smaller branch pipes 6 and 7 are provided, the water flowing through the same being controlled by valves 8 and 9. The pipes 6 is tapered at its end 10 to form a nozzle through which a jet is discharged into a pocket 11 arranged at the bottom 12 of the tank. The water flows from the tank through the pocket 11 and a sieve 13 into a chamber 14 whence it flows through a valve 15 and a stone separating device 21 into the distributing pipe 16 that conducts the water to the field watering pipe system.

A compartment is provided in the tank for the reception of the solid matter such as clay or the like, this compartment being formed by a curved partition 17 which extends obliquely downward to a level near the bottom 12 of the tank so that a comparatively small discharge area 18 is left at the bottom of the compartment. The conical end 19 of the second discharge pipe 7 terminates beneath the opening 18 so as to discharge a strong jet at this point. When the plant in working, and solid matter such as clay or the like is to be mixed with the water in the tank 2 that may be filled to any desired level, the valve 4 is closed and valve 9 is opened so that a powerful jet passes out of the nozzle 19 in a direction substantially parallel to the wall of the tank so that the liquid beneath the opening 18 is caused to flow in a circular path in the tank. The solid matter or clay that is to be added to the water is then thrown into the compartment 17 so that it mixes with the water.

Any large fragments or lumps of clay and stones that are too large to pass through the sieve 13 will settle in the pocket 10. These lumps are continually stirred up and gradually softened and disintegrated by the jet from the pipe 6 when the valve 8 is opened. Coarse stones which are too large to pass through the sieve 13 may be extracted from the pocket 11 by a stone separator 20 connected to the pocket. The water mixed with the fine particles of clay passes through the valve 15 and another stone separator 20 into the pipe 16 that leads to the field watering pipe system.

I claim:—

1. A mixing tank comprising a partition extending downward to a level near the bottom of the tank and forming a compartment for the reception of solid matter, a discharge pocket at the bottom of the tank and at a point of its periphery located at a considerable distance from the compartment, and influx pipes for directing strong liquid jets at the bottom of said compartment and in said pocket.

2. In combination with a field watering plant, a mixing tank comprising a partition extending downward to a level near the tank bottom and forming a compartment for the reception of solid matter, a discharge pocket at the bottom of the tank and at a point of its periphery located at a considerable distance from said compartment, a feed water pipe for filling the tank, a branch pipe for discharging a jet at the bottom of said compartment, and a second branch pipe for discharging a second jet into said pocket.

3. In combination with a field watering plant, a mixing tank comprising a partition extending downward to a level near the tank bottom and forming a compartment for the reception of solid matter, a discharge pocket at the bottom of the tank and at a point of its periphery located at a considerable distance from said compartment, a feed water pipe for filling the tank, a branch pipe for discharging a jet at the bottom of said compartment in a direction substantially parallel to the wall of the tank, a discharge pipe for discharging liquid from the tank, a sieve between said pocket and said discharge pipe, and a second branch pipe for discharging a jet against said sieve so as to prevent it from becoming clogged.

4. In combination with a field watering plant, a mixing tank comprising a partition extending downward to a level near the tank bottom and forming a compartment for the reception of solid matter, a discharge pocket at the bottom of the tank and at a point of its periphery located at a considerable distance from said compartment, a feed water pipe for filling the tank, a branch pipe for discharging a jet at the bottom of said compartment in a direction substantially parallel to the wall of the tank, a discharge pipe for discharging liquid from the tank, a sieve between said pocket and said discharge pipe, a second branch pipe for discharging a jet against said sieve so as to prevent it from becoming clogged, and a device in the discharge pipe for separating stones from the liquid.

5. In combination with a field watering plant, a mixing tank comprising a partition extending downward to a level near the tank bottom and forming a compartment for the reception of solid matter, a discharge pocket at the bottom of the tank and at a point of its periphery located at a considerable distance from said compartment, a feed water pipe for filling the tank, a branch pipe for discharging a jet at the bottom of said compartment in a direction substantially parallel to the wall of the tank, a discharge pipe for discharging liquid from the tank, a sieve between said pocket and said discharge pipe, a second branch pipe for discharging a jet against said sieve so as to prevent it from becoming clogged, a device in the discharge pipe for separating stones from the liquid, and a second device connected to said pocket for separating stones from the liquid.

In testimony whereof I affix my signature in presence of two witnesses.

ALPHONS HORTEN.

Witnesses:
E. RUHSCHEWITZ,
H. MESSEN.